J. B. SINER.
Converting Rotary Motion of a Shaft into Reciprocating Motion.

No. 136,675.    Patented March 11, 1873.

Witnesses.

James B. Siner
by his attorney

UNITED STATES PATENT OFFICE.

JAMES B. SINER, OF LAWRENCE, MASSACHUSETTS, ASSIGNOR TO PARKER C. KIRK AND MICHAEL PENDERGRAST, OF SAME PLACE.

IMPROVEMENT IN CONVERTING ROTARY MOTION OF A SHAFT INTO RECIPROCATING MOTION.

Specification forming part of Letters Patent No. 136,675, dated March 11, 1873.

To all whom it may concern:

Be it known that I, JAMES B. SINER, of Lawrence, of the county of Essex and State of Massachusetts, have invented a new and useful Mechanism for Producing Reciprocating Endwise Motion of a Cylinder while in Revolution; and I do hereby declare the same to be fully described in the following specification and represented in the accompanying drawing, of which—

Figure 1:
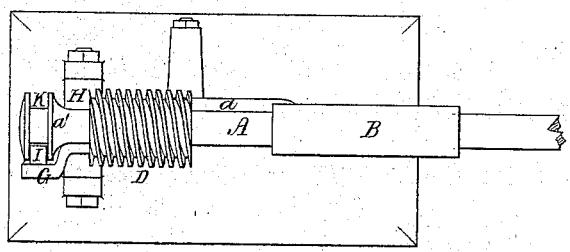
Figure 2:
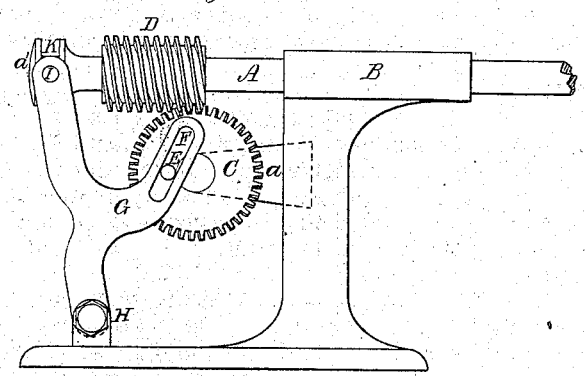
Figure 3:
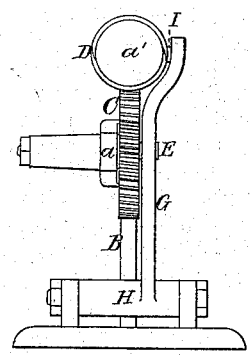

Figure 1 is a top view, Fig. 2 a front elevation, and Fig. 3 an end view.

My invention is especially applicable to the "fancy" of a carding-engine, and may also be used to advantage with the rotary grinder of a machine for grinding cards. In fact, in many other machines, where an endwise motion of a shaft, drum, or roller is requisite, it will be found useful to effect such.

In the drawing, A denotes a shaft, having a bearing in a standard, B, to an arm, a, of which there is pivoted a worm-gear, C, which engages with a worm or screw, D, fixed upon the said shaft, or suitably applied to it, so as to be revolved with and by it while it may be in revolution. From the face of the worm-gear a crank-pin, E, extends into a slot, F, in a lever, G, whose pivot is shown at H. From the upper part of the said lever a stud, I, projects into a groove, K, made transversely in and around the shaft A, or in a head, a', thereof.

While the shaft A may be in revolution it will revolve the screw, which in turn will revolve the gear. The said gear, by means of the crank-pin, will, during each revolution, produce a reciprocating movement of the lever, which, by its connection to the shaft, will impart to such a reciprocating rectilinear motion.

In some cases, instead of making a groove in the shaft and applying a stud to the lever to operate in such groove, I substitute a "spanner" to receive the shaft, embrace the screw at its opposite ends, and be pivoted to the lever, such being a mechanical equivalent for the groove and stud.

I claim—

The combination of the screw D, the gear C, the crank-pin E, the slotted lever G, the stud I, and groove K, all applied to the shaft A and its supporting-standard B, or the equivalent thereof, substantially in the manner and to operate as and for the purpose as specified.

JAMES B. SINER.

Witnesses:
JOHN PENDERGAST,
L. L. BLOOD.